United States Patent
Huang et al.

(10) Patent No.: US 11,997,251 B2
(45) Date of Patent: May 28, 2024

(54) CALIBRATION DEVICE FOR VEHICLE-MOUNTED NIGHT-VISION VIDEO RECORDING APPARATUS

(71) Applicant: AUTEL INTELLIGENT TECHNOLOGY CORP., LTD., Guangdong (CN)

(72) Inventors: Yunyan Huang, Guangdong (CN); Xiaolong Wang, Guangdong (CN); Jin Chen, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 992 days.

(21) Appl. No.: 16/926,365

(22) Filed: Jul. 10, 2020

(65) Prior Publication Data
US 2020/0344466 A1 Oct. 29, 2020

Related U.S. Application Data

(63) Continuation of application No. PCT/CN2019/070773, filed on Jan. 8, 2019.

(30) Foreign Application Priority Data

Jan. 12, 2018 (CN) .......................... 201810031729.3

(51) Int. Cl.
*F16M 11/00* (2006.01)
*B60Q 1/00* (2006.01)
(Continued)

(52) U.S. Cl.
CPC ......... *H04N 17/002* (2013.01); *B60Q 1/0023* (2013.01); *B60S 5/00* (2013.01);
(Continued)

(58) Field of Classification Search
CPC ...... H04N 17/002; H04N 7/18; B60Q 1/0023; B60S 5/00; B66F 9/24; F16M 11/2085;
(Continued)

(56) References Cited

U.S. PATENT DOCUMENTS 7,575,216 B2 * 8/2009 Zimmermann ............ F16F 1/46
248/610
7,637,472 B2 * 12/2009 Endo ........................ F16F 1/373
267/293
(Continued)

FOREIGN PATENT DOCUMENTS

CN 102175880 A 9/2011
CN 103091667 A 5/2013
(Continued)

OTHER PUBLICATIONS

The First Chinese Office Action dated Jul. 7, 2023; Appln. No. 201810031729.3 No English Translation is available.
(Continued)

*Primary Examiner* — Amy J. Sterling

(57) ABSTRACT

The present invention relates to the technical field of automobile maintenance and device calibration, and discloses a device for calibrating a vehicle mounted night-vision video recording apparatus, the device for calibrating the vehicle-mounted night-vision video recording apparatus including a holder assembly and a calibration member. The calibration member is mounted on the holder assembly, the calibration member may move relative to the holder assembly to adjust a height of the calibration member, and the calibration member includes a calibration rod, the calibration rod being disposed horizontally for calibrating the vehicle-mounted night-vision video recording apparatus. In the device for calibrating the vehicle-mounted night-vision video recording apparatus of the present invention, the height of the calibration member is adjustable, and the calibration mem-
(Continued)

ber includes the horizontally disposed calibration rod. Through observation of an vehicle-mounted night-vision display screen interface and adjustment of depression and elevation angles of the vehicle-mounted night-vision video recording apparatus, a horizontal line of an vehicle-mounted screen and the calibration rod overlap, so that calibration of the vehicle-mounted night-vision video recording apparatus is completed. The device for calibrating the vehicle-mounted night-vision video recording apparatus may calibrate different types of vehicle-mounted night-vision video recording apparatuses with simple calibration operations.

18 Claims, 12 Drawing Sheets

(51) Int. Cl.
*B60S 5/00* (2006.01)
*B66F 9/24* (2006.01)
*F16M 11/20* (2006.01)
*F16M 11/24* (2006.01)
*G01B 5/06* (2006.01)
*G01S 13/931* (2020.01)
*G06T 7/80* (2017.01)
*H04N 7/18* (2006.01)
*H04N 17/00* (2006.01)

(52) U.S. Cl.
CPC ........... *B66F 9/24* (2013.01); *F16M 11/2085* (2013.01); *F16M 11/24* (2013.01); *G01B 5/065* (2013.01); *G01S 13/931* (2013.01); *G06T 7/80* (2017.01); *H04N 7/18* (2013.01); *B60R 2300/402* (2013.01); *G06T 2207/10048* (2013.01)

(58) Field of Classification Search
CPC ....... F16M 11/24; G01B 5/065; G01S 13/931; G06T 7/80; G06T 2207/10048; B60R 2300/402
See application file for complete search history.

(56) References Cited

U.S. PATENT DOCUMENTS

| | | | | |
|---|---|---|---|---|
| 8,376,331 | B2* | 2/2013 | Rodecker | F16F 3/0873 |
| | | | | 267/141.1 |
| 9,470,134 | B2* | 10/2016 | Hirukawa | B60K 13/04 |
| 10,089,753 | B1* | 10/2018 | Fegyver | G06T 5/30 |
| 10,196,959 | B2* | 2/2019 | Tanahashi | H05F 3/00 |
| 10,490,098 | B2* | 11/2019 | Becker | G09B 19/24 |
| 11,047,289 | B2* | 6/2021 | Yamazaki | B60K 13/04 |
| 11,598,385 | B2* | 3/2023 | Steinmaier | F01N 13/1811 |
| 11,754,672 | B2* | 9/2023 | Lau | G01S 7/40 |
| | | | | 342/174 |
| 2004/0089493 | A1* | 5/2004 | Chae | F01N 13/1822 |
| | | | | 180/309 |
| 2016/0041234 | A1 | 2/2016 | Li et al. | |
| 2019/0376640 | A1* | 12/2019 | Innes | F16M 11/22 |
| 2020/0348129 | A1* | 11/2020 | DeBoer | G01B 11/275 |
| 2021/0262380 | A1* | 8/2021 | Garcia Ramirez | F16L 27/1004 |
| 2021/0293370 | A1* | 9/2021 | Lai | F16M 11/045 |
| 2022/0003578 | A1* | 1/2022 | Liu | F16M 11/041 |
| 2022/0010717 | A1* | 1/2022 | Azpiazu Echave | |
| | | | | F01N 13/1822 |
| 2022/0057198 | A1* | 2/2022 | Massie | G01S 7/4026 |
| 2022/0234596 | A1* | 7/2022 | Jefferies | B60W 40/12 |
| 2022/0236373 | A1* | 7/2022 | Liu | F16M 11/28 |
| 2023/0010071 | A1* | 1/2023 | Liu | G01S 7/40 |
| 2023/0011610 | A1* | 1/2023 | Liu | G01M 17/00 |
| 2023/0044457 | A1* | 2/2023 | Havener | F16F 1/3732 |
| 2023/0243676 | A1* | 8/2023 | Lawrence | H04N 17/002 |
| | | | | 73/1.01 |

FOREIGN PATENT DOCUMENTS

| | | |
|---|---|---|
| CN | 103908070 A | 4/2014 |
| CN | 103908070 A | 7/2014 |
| CN | 105139411 A | 9/2015 |
| CN | 107449461 A | 12/2017 |
| CN | 107449461 A | 12/2017 |
| CN | 108010090 A | 5/2018 |
| CN | 208298250 U | 12/2018 |
| CN | 208298250 U | 12/2018 |

OTHER PUBLICATIONS

International Search Report mailed Apr. 4, 2019; PCT/CN2019/070773.

* cited by examiner

CALIBRATION DEVICE FOR VEHICLE-MOUNTED NIGHT-VISION VIDEO RECORDING APPARATUS

This application is a continuation of International Patent Application No. PCT/CN2019/070773 filed on Jan. 8, 2019, which claims priority to Chinese Patent Application No. 201810031729.3 filed on Jan. 12, 2018, both of which are incorporated by reference herein in their entireties.

BACKGROUND

Technical Field

This application relates to the technical field of vehicle maintenance and device calibration, and in particular, to a device for calibration device for vehicle-mounted night-vision video recording apparatus.

Related Art

In the field of advanced driver assistant systems (ADAS) of an automobile, a night-vision assistant system can help a driver automatically identify an animal or a large foreign object in case of unclear sight, an indistinct night, or severe weather, and alert a road condition ahead to avoid an accident. A way for distinguishing is to sense a difference in heat using infrared light, so as to distinguish a difference in a person, an animal, a vehicle, and an environment. An object that is processed and transformed into an image and that cannot be originally clearly seen is clearly presented to a driver, to reduce a risk during driving.

A main working principle of a night vision function is detecting an object such as a pedestrian in front of a vehicle through an vehicle-mounted night-vision video recording apparatus (usually an infrared video recording apparatus) and in combination with an vehicle mounted active infrared searchlight or a passive searchlight. In addition to measurement performance of the video recording apparatus, a mounting position and a mounting angle thereof determine correctness and accuracy of final measurement data thereof. The foregoing mounting position and mounting angle may change due to uncontrollable factors such as vibration and collision caused during use of the vehicle. Therefore, in the field of vehicle maintenance and device calibration, especially in calibration of the night vision function, calibration of the video recording apparatus is core content thereof.

During implementation of the present invention, an inventor finds that existing calibration is mainly a single vehicle type calibration tool, that is, one calibration tool can only be used to calibrate an vehicle-mounted video recording apparatus of a single vehicle type. In addition, a method for calibration excessively depends on software computing, and a plurality of times of repeated calibration is required, which is complex and inconvenient in use.

SUMMARY

In order to resolve the foregoing technical problems, embodiments of the present invention provide a convenient calibration device for vehicle-mounted night-vision video recording apparatus.

In the embodiments of the present invention, the technical problems are resolved using the following technical solutions.

The calibration device for the vehicle-mounted night-vision video recording apparatus includes a holder assembly and a calibration member. The calibration member is mounted on the holder assembly, the calibration member may move relative to the holder assembly to adjust a height of the calibration member, and the calibration member includes a calibration rod, the calibration rod being disposed horizontally for calibrating the vehicle-mounted night-vision video recording apparatus.

Optionally, the holder assembly includes a base, a vertical rod, and a sliding assembly;
  the vertical rod being disposed vertically, one end thereof being fixed to the base;
  the sliding assembly is movably mounted on the vertical rod, and may slide along the vertical rod; and
  the calibration member is mounted on the sliding assembly.

Optionally, the calibration member includes a fixed portion, the fixed portion being mounted on the calibration rod, the fixed portion including a fixed shaft, and the fixed shaft being perpendicular to the calibration rod; and
  an accommodating hole is disposed on the sliding assembly, and the fixed shaft is accommodated in the accommodating hole.

Optionally, the fixed portion includes a locating pin, the fixed shaft being parallel to the locating pin; and
  a locating hole is disposed on the sliding assembly, and the locating pin is accommodated in the locating hole.

Optionally, the fixed portion includes a fixed portion body, the fixed portion body being sleeved on the calibration rod, one end of the fixed shaft being fixedly connected to the fixed portion body, and one end of the locating pin being also fixedly connected to the fixed portion body.

Optionally, the fixed portion is fixedly mounted on a middle portion of the calibration rod.

Optionally, the calibration rod is a carbon fibre tube having a length of one meter.

Optionally, the sliding assembly includes a fixture, the fixture including a fixture body, a clamping portion, a connecting rod, and a handle;
  two clamping portions extending from the fixture body, an accommodating hole being disposed between the two clamping portions, there being a gap between the two clamping portions, and the gap being in communication with the accommodating hole;
  one end of the connecting rod penetrating through one of the clamping portions and being fixed to the other clamping portion, and the other end of the connecting rod being hinged at the handle; and
  a cam block and a rotation shaft being disposed on the handle, one end that is of the connecting rod and that is away from the clamping portion is connected to the rotation shaft, the two cam blocks being sleeved on both ends of the rotation shaft, and the two cam blocks rotating relative to the rotation shaft to press against the clamping portion, so that the two clamping portions clamp the fixed shaft.

Optionally, the fixture includes a compressing block, the compressing block being sleeved on the connecting rod, and the compressing block being located between the clamping portion and the cam block.

Optionally, the sliding assembly includes a clamping member, the clamping member being sleeved on the vertical rod and sliding along the vertical rod, and the clamping member clamping the vertical rod to fix the sliding assembly to a required position.

Optionally, a rack is further disposed on the vertical rod, the rack being disposed in a vertical direction;

the sliding assembly includes a self-locking member, the self-locking member including a fine adjustment knob and an adjusting gear;

the fine adjustment knob being movably adjusted on the clamping member, and the fine adjustment knob rotating relative to the clamping member; and the adjusting gear being sleeved on the fine adjustment knob, and the adjusting gear being meshed with the rack to fine adjust a height of the sliding assembly.

Optionally, the self-locking member includes a fixed rotation shaft, a pressing plate, and an elastic member;

both ends of the fixed rotation shaft being respectively fixed to the clamping member, and a central axis of the fixed rotation shaft being parallel to a central axis of the fine adjustment knob;

the pressing plate being sleeved on the fixed rotation shaft and the fine adjustment knob, the pressing plate rotating around the fixed rotation shaft for driving the fine adjustment knob to move relative to the clamping member, so that the gear is separated from the rack; and the elastic member being compressed between the pressing plate and the clamping member for providing recovery elasticity for the pressing plate, so that the adjusting gear compresses the rack.

Optionally, the pressing plate includes a pressing plate body and a mounting ear;

two mounting ears extending from the pressing plate body, and the pressing plate body being sleeved on the fixed rotation shaft; and the two mounting ears being sleeved on the fine-tuning knob, and the adjusting gear being located between the two mounting ears.

Optionally, the clamping member includes a first clamping plate, a second clamping plate, and a locking knob;

the first clamping plate and the second clamping plate being respectively located at two opposite sides of the vertical rod and respectively abutting against the vertical rod; and one end of the locking knob penetrating through the first clamping plate, and the locking knob being engaged with the first clamping plate using threads, and when the locking knob is rotated, the locking knob penetrating through one end of the first clamping plate to abut against the vertical rod, so that the clamping member is fixed to the vertical rod.

Optionally, the clamping member includes a friction pad and a pad screw;

the friction pad being disposed between the first clamping plate and the vertical rod for increasing friction between the first clamping plate and the vertical rod; and one end of the pad screw penetrating through the first clamping plate and abutting against the friction pad, and when the pad screw is rotated, a degree of contact between the friction pad and the vertical rod being adjusted, so as to adjust a magnitude of friction between the friction pad and the vertical rod.

Optionally, the base includes a base body, a horizontal adjustment member, and a gradienter;

one end of the vertical rod being fixedly mounted on the base body;

the horizontal adjustment member being mounted on the base body for adjusting a horizontal angle of the base body; and the gradienter being mounted on the base body for detecting whether the base body is horizontally disposed.

Optionally, the base includes a supporting member, one end of the supporting member being fixedly mounted on a lower surface of the base body, and there being at least one supporting member, where an intersection point formed through intersection of one supporting member and the lower surface and two intersection points formed respectively through intersection of the two horizontal adjustment members and the lower surface are respectively located at three vertexes of an isosceles triangle.

Optionally, there are three supporting members, the three supporting members being arranged in order along a first straight line; and the two horizontal adjustment members are arranged in order along a second straight line, the first straight line being parallel to the second straight line.

Optionally, the horizontal adjustment member includes a handle and a screw portion;

the handle being fixedly mounted on one end of the screw portion, and the handle being located over the base body to facilitate rotation of the horizontal adjustment member; and the screw portion penetrating through the base body, the screw portion being engaged with the base body using threads, and the screw portion being vertically disposed.

Optionally, there are at least three horizontal adjustment members, where the three horizontal adjustment members respectively intersect the lower surface of the base body to form three intersection points, the three intersection points being respectively located at three vertexes of an isosceles triangle.

Optionally, the gradienter is mounted on an upper surface of the base body, and the gradienter includes a first horizontal bead and a second horizontal bead, the first horizontal bead being perpendicular to the second horizontal bead.

Optionally, a first calibrating line, a second calibrating line, and a third calibrating line are disposed on the upper surface of the base body;

the first calibrating line and the second calibrating line being located on a same straight line; and the third calibrating line being perpendicular to the first calibrating line and the second calibrating line, and a straight line on which the third calibrating line is located passing through an intersection point of the vertical rod and the base body.

Optionally, a first calibrating line and a third calibrating line are disposed on an upper surface of the base body;

the third calibrating line being perpendicular to the first calibrating line, and a straight line on which the third calibrating line is located passing through an intersection point of the vertical rod and the base body.

Optionally, the third calibrating line is parallel to a central axis of the accommodating hole, and the third calibrating line and the central axis of the accommodating hole are located in a same vertical plane.

Optionally, a height gauge is disposed for the vertical rod for measuring a moving distance or a height of the sliding assembly.

In comparison to the prior art, in the device for calibrating the vehicle-mounted night-vision video recording apparatus of the embodiments of the present invention, the height of the calibration member is adjustable, and the calibration member includes the horizontally disposed calibration rod. Through observation of an vehicle-mounted night-vision display screen interface and adjustment of depression and elevation angles of the vehicle-mounted night-vision video recording apparatus, a horizontal line of an vehicle-mounted screen and the calibration rod overlap, so that calibration of the vehicle-mounted night-vision video recording apparatus is completed. The device for calibrating the vehicle-mounted night-vision video recording apparatus may calibrate different types of vehicle-mounted night-vision video recording apparatuses with simple calibration operations.

BRIEF DESCRIPTION OF THE DRAWINGS

One or more embodiments are described by way of example with reference to the corresponding figures in the accompanying drawings, and the descriptions are not to be construed as limiting the embodiments. Elements in the accompanying drawings that have same reference numerals are represented as similar elements, and unless otherwise particularly stated, the figures in the accompanying drawings are not drawn to scale.

DETAILED DESCRIPTION

For ease of understanding the present invention, the present invention is described in further detail below with reference to the accompanying drawings and specific embodiments. It should be noted that an element described as being "fixed" to another element may be directly on the other element, or one or more intervening components may be present. An element described as being "connected" to another element may be directly connected to the other element, or one or more intervening components may be present. The terms "vertical", "horizontal", "left", "right", "inside", "outside", and similar expressions, as used in this specification, are for the purpose of description only.

Unless otherwise defined, all technical and scientific terms used herein have the same meaning as commonly understood by one of ordinary skill in the art to which the present invention belongs. The terms used in the specification of the present invention are merely used for describing specific embodiments, and are not intended to limit the present invention. As used herein, the term "and/or" includes any and all combinations of one or more related items listed.

In addition, the technical features provided in different embodiments of the present invention to be described below may be combined with each other as long as no conflict occurs.

Figure 1:
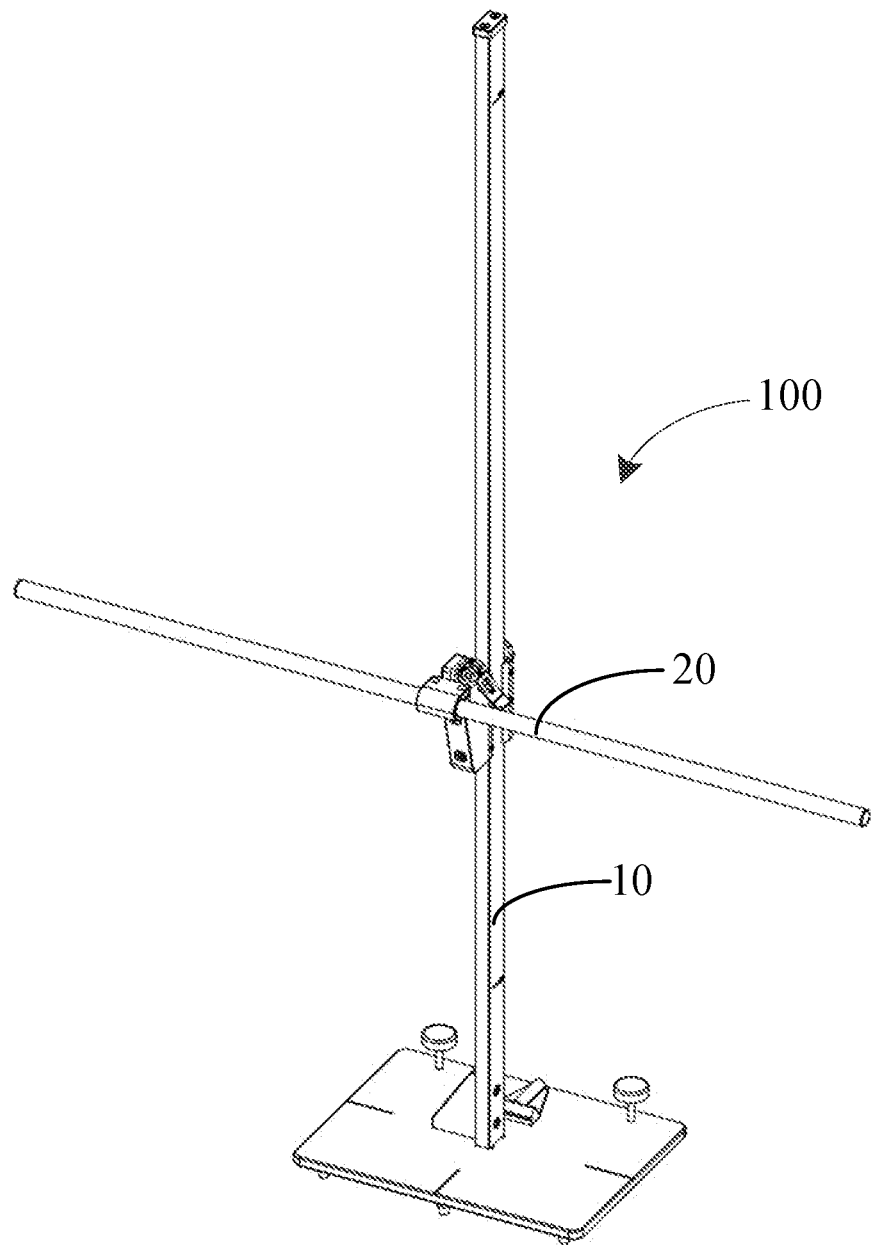
FIG. 1 is a three-dimensional diagram of a device for calibration device for vehicle-mounted night-vision video recording apparatus according to an embodiment of the present invention.

Referring to FIG. 1, a device 100 for calibrating a vehicle-mounted night-vision video recording apparatus according to an embodiment of the present invention includes a holder assembly 10 and a calibration member 20. The calibration member 20 is mounted on the holder assembly 10, and the calibration member 20 may move relative to the holder assembly 10 along a vertical direction, to adjust a height of the calibration member 20.

Figure 2:
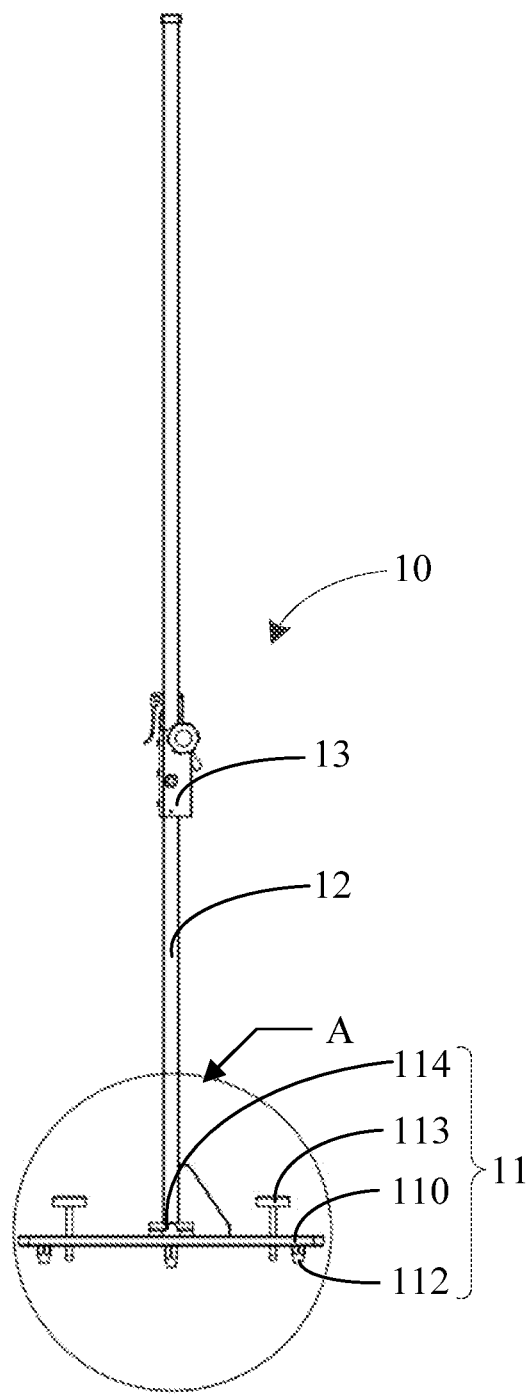
FIG. 2 is a three-dimensional diagram of a calibration device from another perspective shown in FIG. 1.
Figure 3:
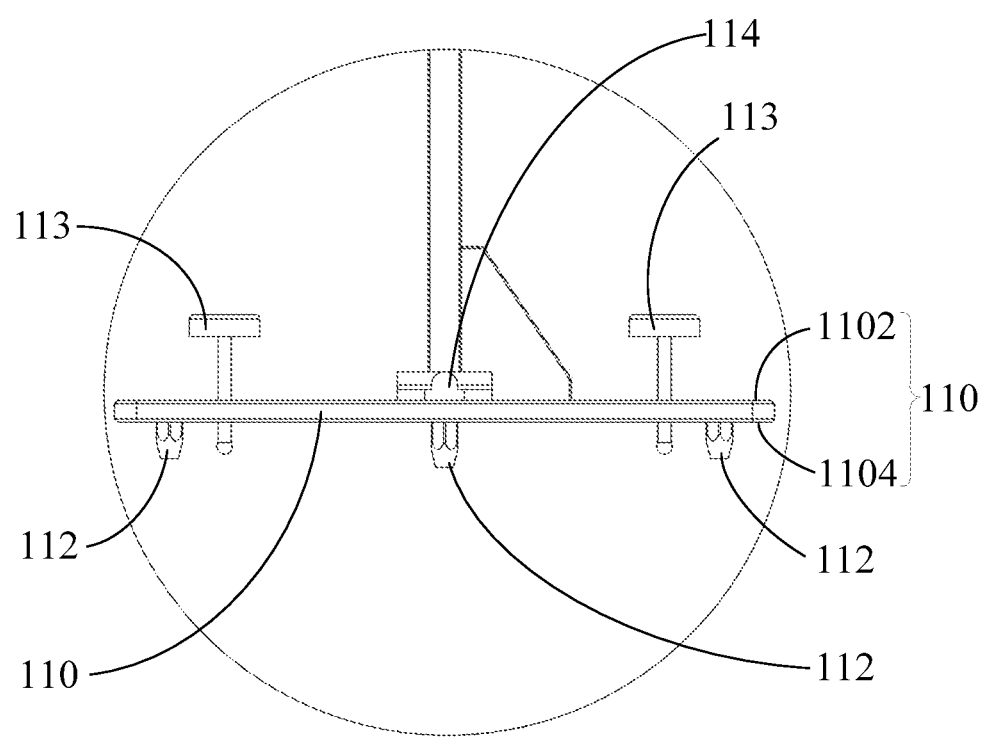
FIG. 3 is a partial enlarged diagram of a portion A in FIG. 2.

Referring to both FIG. 2 and FIG. 3, the holder assembly 10 includes a base 11, a vertical rod 12, and a sliding assembly 13. The vertical rod 12 is vertically disposed, one end thereof being fixedly mounted on the base 11. The sliding assembly 13 is movably mounted on the vertical rod 12, and the sliding assembly 13 may slide along the vertical rod 12.

The base 11 includes a base body 110, a supporting member 112, a horizontal adjustment member 113, and a gradienter 114.

The base body 110 is a rectangular plate and may be made of a metal material with a large mass, so that the holder assembly 10 has a low center of gravity, so that a calibration member 20 that is connected to the sliding assembly 13 can be stably supported. The base body 110 includes an upper surface 1102 and a lower surface 1104.

Figure 4:
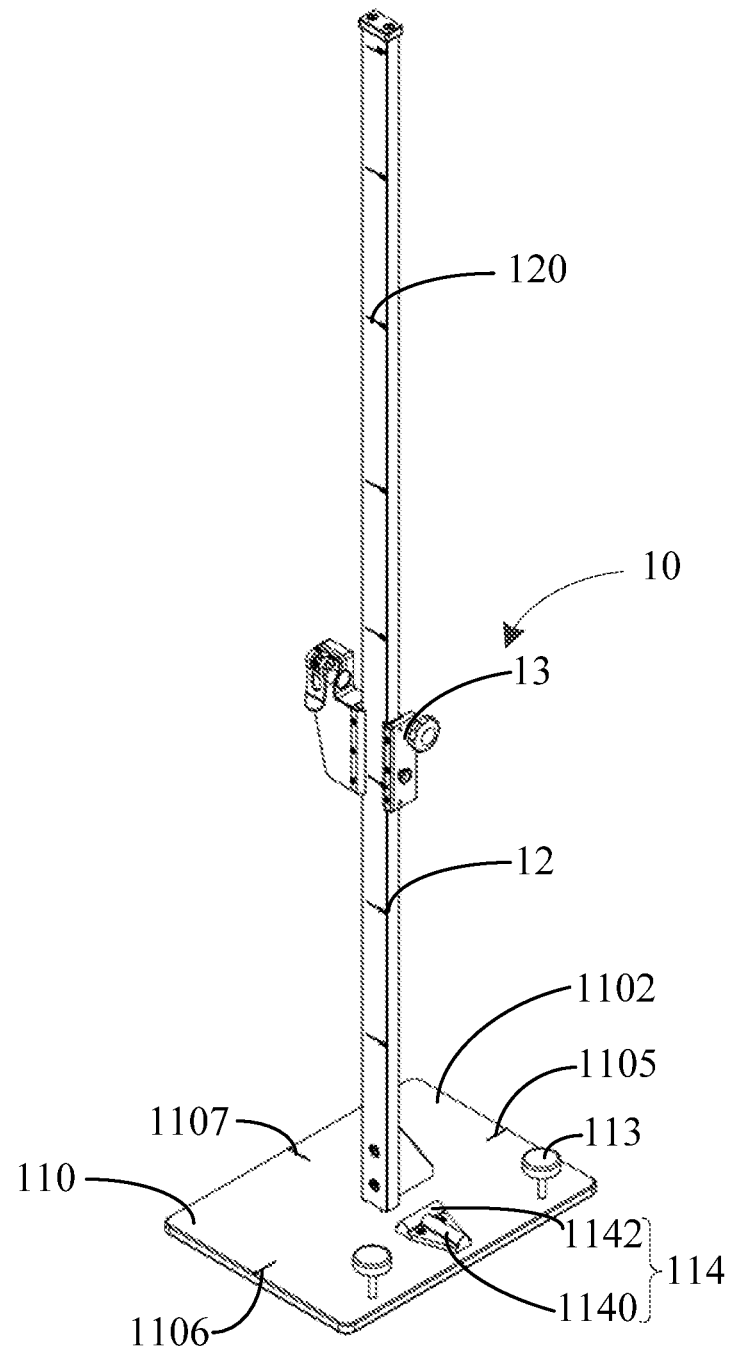
FIG. 4 is a three-dimensional diagram of a calibration device from still another perspective shown in FIG. 1.
Figure 5:
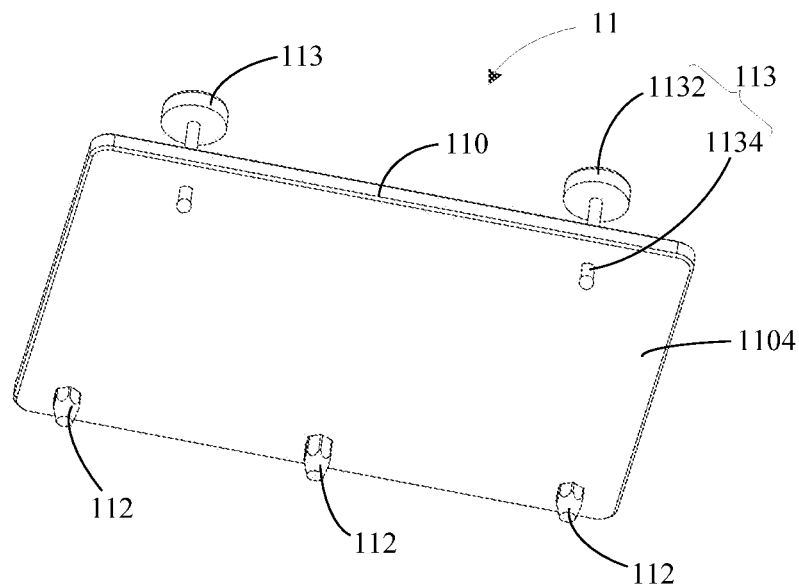
FIG. 5 is a three-dimensional diagram of a base of a calibration device shown in FIG. 1.

Referring to both FIG. 4 and FIG. 5, a first calibrating line 1105, a second calibrating line 1106, and a third calibrating line 1107 are disposed on the upper surface 1102. The first calibrating line 1105 and the second calibrating line 1106 are located on a same straight line. The third calibrating line 1107 is perpendicular to the first calibrating line 1105 and the second calibrating line 1106. It may be understood that, in some other embodiments, either or both of the first calibrating line 1105 and the second calibrating line 1106 may be omitted, that is, only one of the first calibrating line 1105 or the second calibrating line 1106 is disposed on the upper surface 1102, or neither of the first calibrating line 1105 or the second calibrating line 1106 is disposed on the upper surface.

Definitely, a fourth calibrating line (not shown in the figure) may further be disposed on the upper surface 1102, the fourth calibrating line and the third calibrating line 1105 being located on a same straight line, which is not limited thereto.

The supporting member 112 is disposed on the lower surface 1104, and the supporting member 112 is substantially columnar and disposed along a vertical direction. One end of the supporting member 112 is fixedly mounted on the lower surface 1104. The three supporting members 112 are arranged in order along a first straight line. The first straight line is parallel to the first calibrating line 1105 and the second calibrating line 1106.

A horizontal adjustment member 113 includes a handle 1132 and a screw portion 1134. The handle 1132 is fixedly mounted on one end of the screw portion 1134. The screw portion 1134 penetrates through the upper surface 1102 and the lower surface 1104. The screw portion 1134 is engaged with the base body 110 through threads, and the screw portion 1134 is vertically disposed. The handle 1132 is located over the upper surface 1102 to facilitate rotation of the horizontal adjustment member 113, so that the horizontal adjustment member 113 moves relative to the base body 110 along a vertical direction, so as to adjust depression and elevation angles of the base body 110. Two horizontal adjustment members 113 are arranged in order along a second straight line. The first straight line is parallel to the second straight line. An intersection point formed through intersection of one of the supporting members 112 and the lower surface 1104, and two intersection points formed respectively through intersection of the two horizontal adjustment members 113 and the lower surface 1104 are respectively located at three vertexes of an isosceles triangle.

It may be understood that, in some other embodiments, a quantity of supporting members 112 may be increased or decreased according to an actual requirement, but there must be at least one supporting member, and one intersection point formed through intersection of one of the supporting members 112 and the lower surface 1104, and two intersection points formed respectively through intersection of the two horizontal adjustment members 113 and the lower surface 1104 are respectively located at the three vertexes of the isosceles triangle.

It may be understood that, in some other embodiments, the horizontal adjustment member 113 may be formed by other structures as long as the structures can adjust depression and elevation angles of the base body 110. There may alternatively be at least three horizontal adjustment members 113, but the supporting member 112 is omitted. In addition, the three horizontal adjustment members 113 respectively intersect the lower surface 1104 of the base body 110 to form three intersection points, the three intersection points being respectively located at the three vertexes of the isosceles triangle.

A gradienter 114 is mounted on the upper surface 1102 for detecting whether the base body 110 is horizontally disposed. The gradienter 114 includes a first horizontal bead 1140 and a second horizontal bead 1142, the first horizontal bead 1140 being perpendicular to the second horizontal bead 1142. It may be understood that, in some other embodiments, the gradienter 114 may also be formed by other structures as long as the structures can be used to detect whether the base body 110 is horizontally disposed.

One end of the vertical rod 12 is fixedly mounted on the upper surface 1102, and the vertical rod 12 is perpendicular to the base body 110. A straight line on which the third calibrating line 1107 is located passes through an intersection point of the vertical rod 12 and the base body 110. A height gauge 120 is disposed for the vertical rod 12 for measuring a moving distance or a height of the sliding assembly 13. A rack 122 is further disposed on the vertical rod 12, the rack 122 being disposed along a vertical direction (see FIG. 9).

Figure 6:
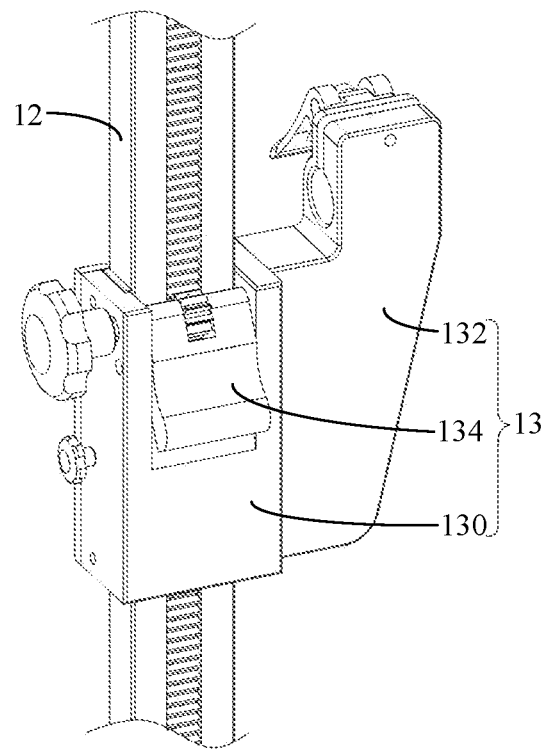
FIG. 6 is a schematic assembly diagram of a sliding assembly and a vertical rod of a calibration device shown in FIG. 1.

Referring to FIG. 6, the sliding assembly 13 is made of an elastic material, for example, a metal material or a plastic material, etc. The sliding assembly 13 includes a clamping member 130, a fixture 132, and a self-locking member 134. The clamping member 130 is sleeved on the vertical rod 12, may slide along the vertical rod 12, and may clamp the vertical rod 12 to fix the sliding assembly 13 to a required position. The fixture 132 is fixedly mounted on the clamping member 130 for supporting the calibration member 20. The self-locking member 134 is mounted on the clamping member 130 for switching between large-stroke adjustment of a height of the sliding assembly 13 and fine adjustment of the height of the sliding assembly 13.

Figure 7:
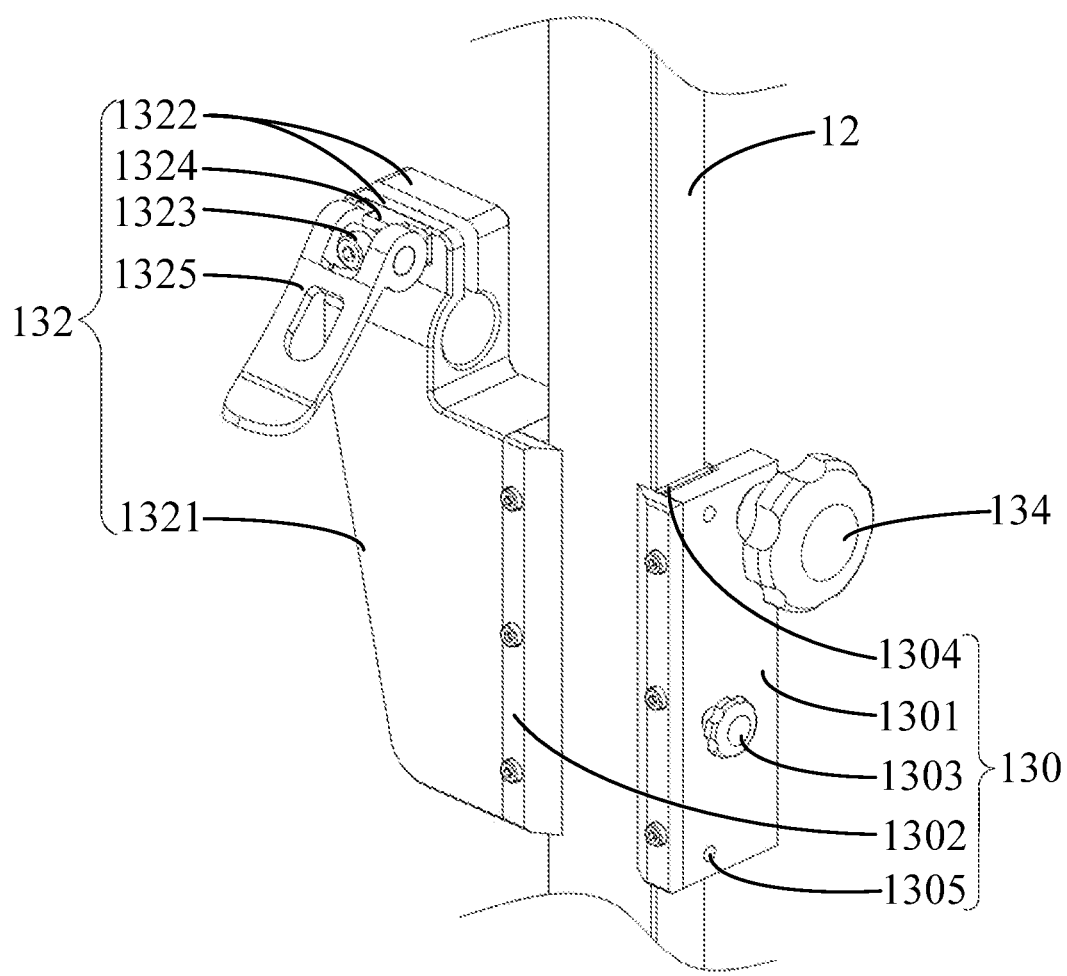
FIG. 7 is a schematic assembly diagram of a sliding assembly and a vertical rod of a calibration device shown in FIG. 1 from another perspective, where a handle of the sliding assembly is pulled up.

Referring to FIG. 7, the clamping member 130 includes a first clamping plate 1301, a second clamping plate 1302, a locking knob 1303, a friction pad 1304, and a pad screw 1305.

The first clamping plate 1301 is connected to the second clamping plate 1302, and the first clamping plate 1301 and the second clamping plate 1302 are respectively located at two opposite sides of the vertical rod 12 and respectively abut against the vertical rod 12.

One end of the locking knob 1303 penetrates through the first clamping plate 1301, and the locking knob 1303 is engaged with the first clamping plate 1301 through threads. The locking knob 1303 is rotated to enable the locking knob 1303 to penetrate through one end of the first clamping plate 1301 and abut against the vertical rod 12, so that the clamping member 130 is fixed to the vertical rod 12.

The friction pad 1304 is disposed between the first clamping plate 1301 and the vertical rod 12 for increasing friction between the first clamping plate 1301 and the vertical rod 12.

There are two pad screws 1305, and one end of each of the pad screws 1305 penetrates through the first clamping plate 1301 and abuts against the friction pad 1304. The pad screw 1305 is rotated to adjust a degree of contact between the friction pad 1304 and the vertical rod 12, so as to adjust a magnitude of friction between the friction pad 1304 and the vertical rod 12. In this embodiment, the magnitude of friction between the friction pad 1304 and the vertical rod 12 may be adjusted as required, so that the sliding assembly 13 may smoothly slide relative to the vertical rod 12. It may be understood that, in some other embodiments, the friction pad 1304 and the pad screw 1305 may be omitted.

Figure 8:
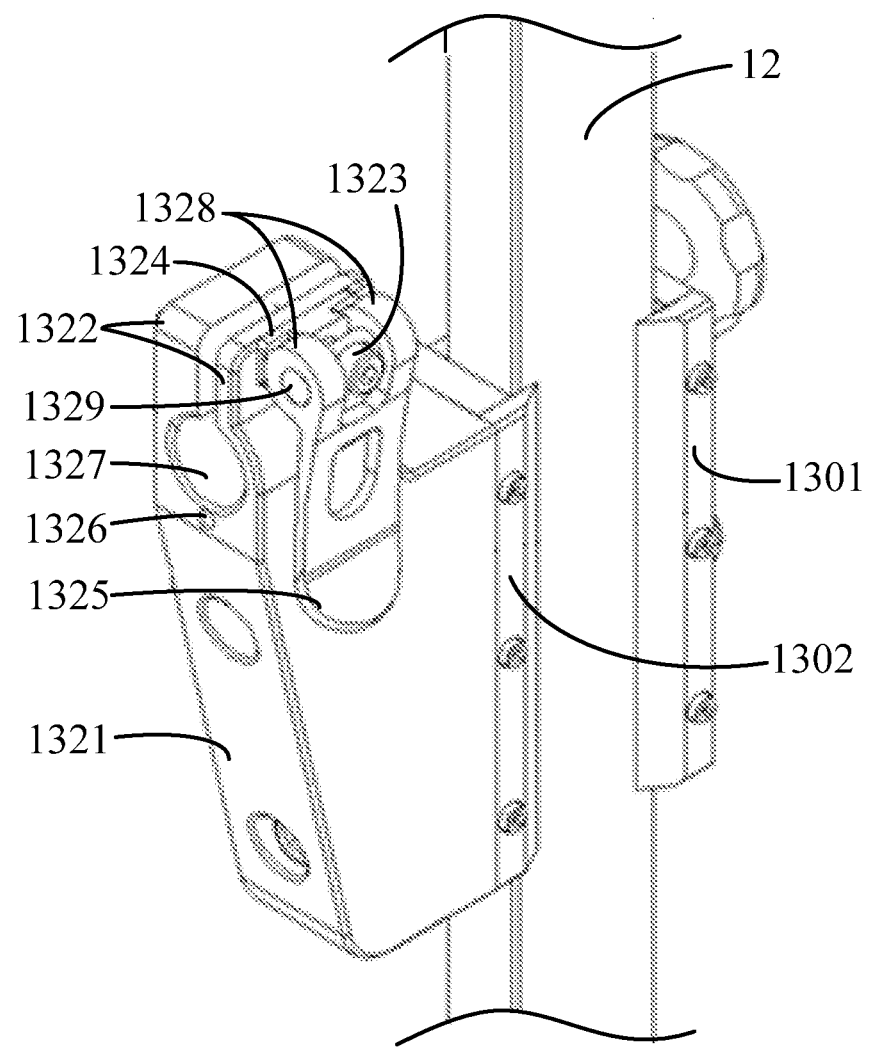
FIG. 8 is a three-dimensional assembly diagram of a sliding assembly and a vertical rod of a calibration device shown in FIG. 1 from still another perspective, where the handle is depressed.
Figure 9:
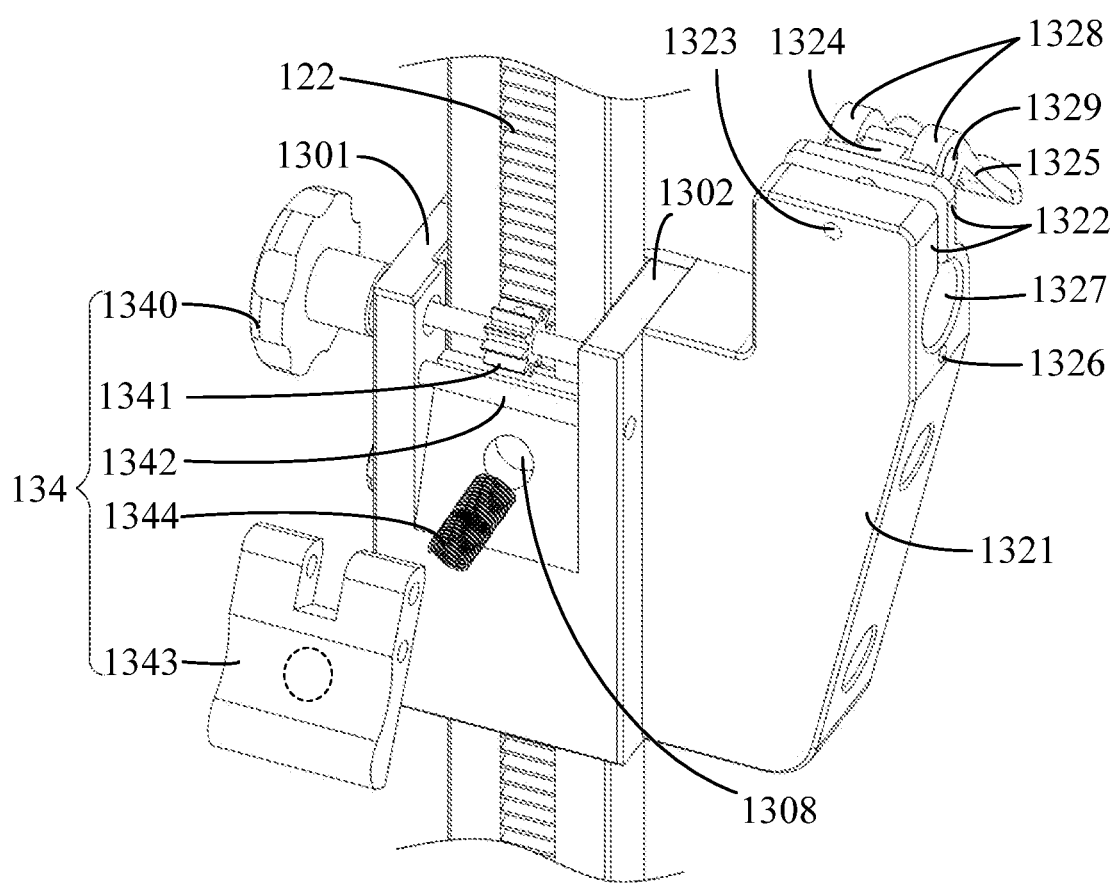
FIG. 9 is a partial exploded diagram of a sliding assembly of a calibration device shown in FIG. 1.

With reference to FIG. 7 and referring to both FIG. 8 and FIG. 9, the fixture 132 includes a fixture body 1321, a clamping portion 1322, a connecting rod 1323, a compressing block 1324, and a handle 1325.

The fixture body 1321 is fixedly connected to the second clamping plate 1302, and a locating hole 1326 is disposed on the fixture body 1321.

Two clamping portions 1322 extend from the fixture body 1321, an accommodating hole 1327 is disposed between the two clamping portions 1322, and there is a gap between the two clamping portions 1322, the gap being in communication with the accommodating hole 1327. The locating hole 1326 and the accommodating hole 1327 are both cylindric and horizontally disposed. A central axis of the locating hole 1326 and a central axis of the accommodating hole 1327 are both parallel to the third calibrating line 1107, and the central axis of the locating hole 1326, the central axis of the accommodating hole 1327, and the third calibrating line 1107 are located in a same vertical plane.

One end of the connecting rod 1323 penetrates through one of the clamping portions 1322 and is fixed to the other clamping portion 1322, and the other end of the connecting rod 1323 is hinged on the handle 1325. The compressing block 1324 is sleeved on the connecting rod 1323, and the compressing block 1324 is located between the clamping portion 1322 and the handle 1325. The compressing block 1324 may be made of a metal material such as copper.

A cam block 1328 and a rotation shaft 1329 are disposed on the handle 1325. One end that is of the connecting rod 1323 and that is away from the clamping portion 1322 is connected to a central portion of the rotation shaft 1329. Two cam blocks 1328 are sleeved on both ends of the rotation shaft 1329, the two cam blocks 1328 may rotate relative to the rotation shaft 1329, and the two cam blocks 1328 are parallel to each other and are spaced apart by a preset distance.

The handle 1325 is pressed to enable the two cam blocks 1328 to rotate around the rotation shaft 1329. During rotation of the cam blocks 1328, the cam blocks 1328 press against the compressing block 1324 to enable the two clamping portions 1322 to move toward each other, and the accommodating hole 1327 is narrowed to clamp the calibration member 20 (see FIG. 8). The handle 1325 is pulled up to enable the two cam blocks 1328 to rotate oppositely around the rotation shaft 1329, the cam blocks 1328 release squeezing of the compressing portion 1324, the two clamping portions 1322 move away from each other, and the accommodating hole 1327 is enlarged to take the calibration member 20 down from the fixture 132 (see FIG. 7). With the fixture 132 of this embodiment, the calibration member 20 may be conveniently and rapidly mounted or dismantled. In addition, the compressing block 1324 is disposed between the clamping portion 1322 and the handle 1325 to increase a degree of squeezing the clamping portion 1322 by the two cam blocks 1328, so that the two clamping portions 1322 may clamp the calibration member 20 more firmly.

It may be understood that, in some other embodiments, the compressing block 1324 may be omitted, and the two cam blocks 1328 may directly squeeze the clamping portion 1322.

Figure 10:
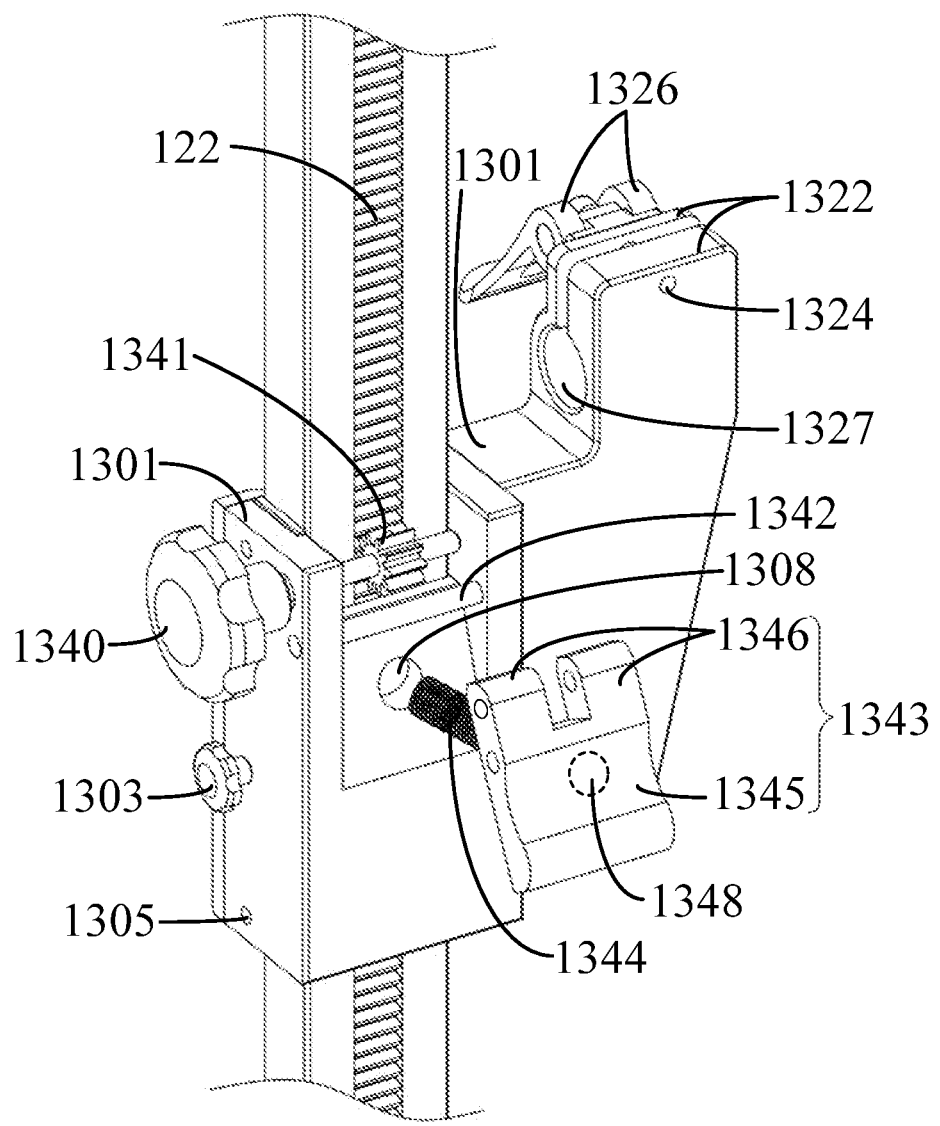
FIG. 10 is a partial exploded diagram of a sliding assembly of a calibration device shown in FIG. 1 from another perspective.

Referring to both FIG. 9 and FIG. 10, the self-locking member 134 includes a fine adjustment knob 1340, an adjusting gear 1341, a fixed rotation shaft 1342, a pressing plate 1343, and an elastic member 1344.

One end of the fine adjustment knob 1340 is movably mounted on the second clamping plate 1302 after penetrating through the first clamping plate 1301. The fine adjustment knob 1340 may rotate relative to the first clamping plate 1301 and the first clamping plate 1302, and may move in parallel relative to the first clamping plate 1301 and the first clamping plate 1302.

The adjusting gear 1341 is sleeved on the fine adjustment knob 1340 and located between the first clamping plate 1301 and the second clamping plate 1302, and the adjusting gear 1341 is meshed with the rack 122.

Both ends of the fixed rotation shaft 1342 are respectively fixedly mounted on the first clamping plate 1301 and the first clamping plate 1302, and a central axis of the fixed rotation shaft 1342 is parallel to a rotation axis of the fine adjustment knob 1340.

The pressing plate 1343 includes a pressing plate body 1345 and a mounting ear 1346. A first mounting hole 1348 is disposed on the pressing plate body 1345. Two mounting ears 1346 extend from the pressing plate body 1345, and the two mounting ears 1346 are spaced apart by a preset distance and disposed in parallel. The pressing plate body 1345 is sleeved on the fixed rotation shaft 1342, the two mounting ears 1346 are sleeved on the fine adjustment knob 1340, and the adjusting gear 1341 is located between the two mounting ears 1346.

The elastic member 1344 is compressed between the pressing plate 1343 and the clamping member 130. Both ends of the elastic member 1344 are respectively accommodated in a first mounting hole 1348 of the pressing plate 1343 and a second mounting hole 1308 of the clamping member 130. In this embodiment, the elastic member 1344 is a compression spring for providing recovery elasticity. It may be understood that, in some other embodiments, the elastic member 1344 may be a spring piece or other elastic members that can provide the recovery elasticity.

The pressing plate 1343 is pressed, so that the pressing plate 1343 rotates around the fixed rotation shaft 1342. The elastic member 1344 is further compressed, and the mounting ear 1346 drives the fine adjustment knob 1340 to move relative to the first clamping plate 1301 and the second clamping plate 1302, so that the gear 1341 is separated from the rack 122. In this case, the locking knob 1303 is rotated to enable the locking knob 1303 to be not in contact with the vertical rod 12, and the sliding assembly 13 may move relative to the vertical rod 12 by a large stroke. The pressing plate 1343 is loosened, the elastic member 1344 generates the recovery elasticity to push the pressing plate 1343 to rotate reversely around the fixed rotation shaft 1342, so that the adjusting gear 1341 is meshed with the rack 122. In this case, the elastic member 1344 provides elasticity to enable the adjusting gear 1341 to press against the rack 122. The fine adjustment knob 1340 is rotated, so that the adjusting gear 1341 rotates and drives the rack 122 to move, and a position of the sliding assembly 13 relative to the vertical rod 12 may be fine adjusted.

With the self-locking member 134, the height of the sliding assembly 13 may be adjusted by a large stroke, or the height of the sliding assembly 13 may be fine adjusted. It may be understood that, in some other embodiments, the fixed rotation shaft 1342, the pressing plate 1343, and the elastic member 1344 may be omitted, the adjusting gear 1341 is meshed with the rack 122, and the self-locking member 134 may only fine adjust the height of the sliding assembly 13. Alternatively, the self-locking member 134 and the rack 122 may be omitted, and the height of the sliding assembly 13 may be adjusted only by a large stroke.

Figure 11:
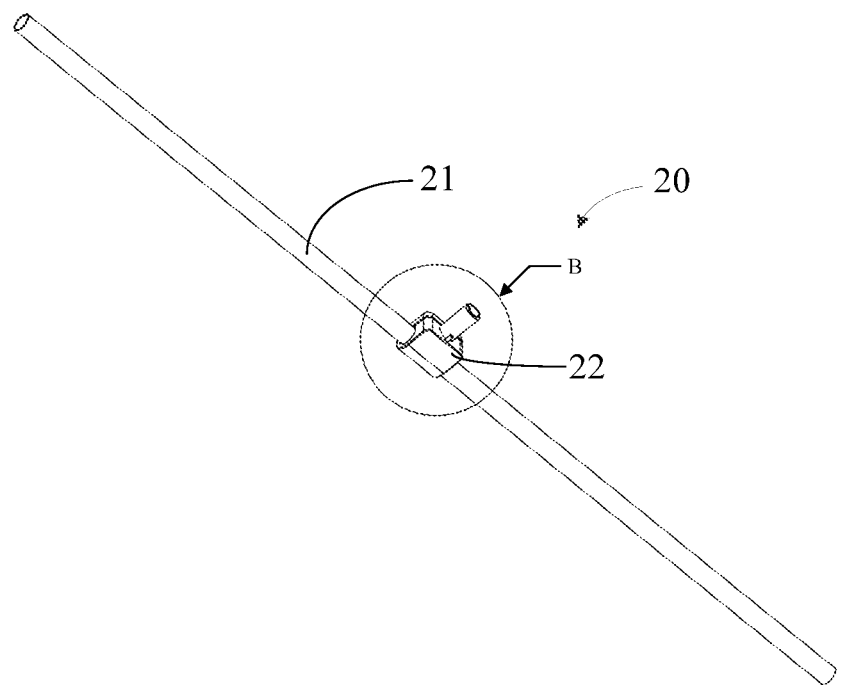
FIG. 11 is a three-dimensional diagram of a calibration member of a calibration device shown in FIG. 1.
Figure 12:
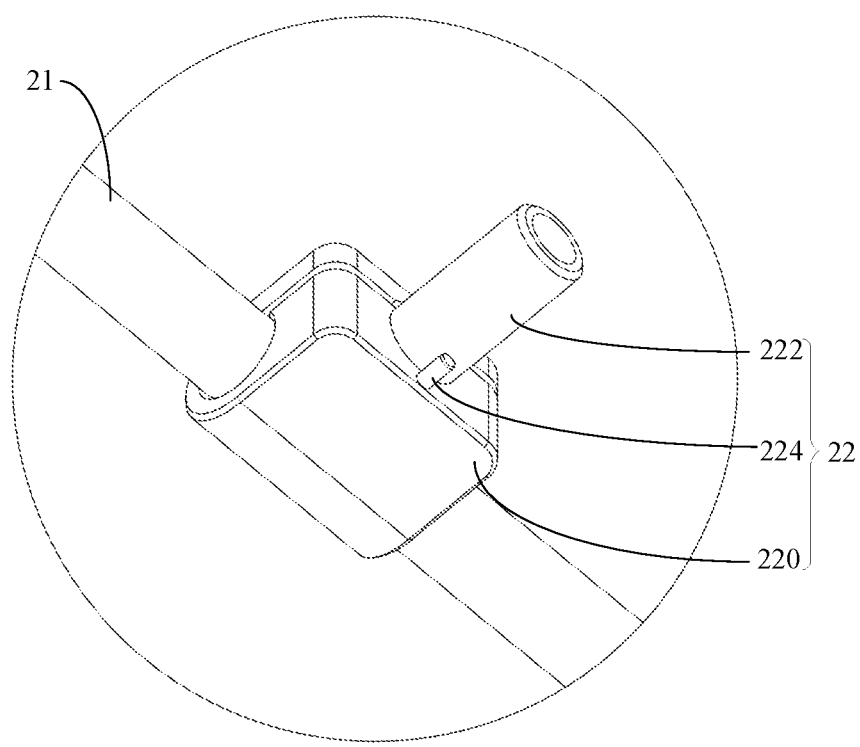
FIG. 12 is a partial enlarged diagram of a portion B in FIG. 11.

Referring to both FIG. 11 and FIG. 12, the calibration member 20 includes a calibration rod 21 and a fixed portion 22. The calibration rod 21 is a carbon fibre tube having a length of one meter, has high straightness and coaxiality, and is not easily deformed.

The fixed portion 22 is fixedly mounted on a middle portion of the calibration rod 21. The fixed portion 22 includes a fixed portion body 220, a fixed shaft 222, and a locating pin 224. The fixed portion body 220 is sleeved on the calibration rod 21. One end of the fixed shaft 222 is fixedly connected to the fixed portion body 220, and one end of the locating pin 224 is also fixedly connected to the fixed portion body 220. Both the fixed shaft 222 and the locating pin 224 are cylindric, and the fixed shaft 222 and the locating pin 224 are parallel to each other and perpendicular to the calibration rod 21.

Referring to both FIG. 8 and FIG. 12, when the calibration member 20 is mounted on the fixture 132, the fixed shaft 222 is inserted into the accommodating hole 1327, and the locating pin 224 is inserted into the locating hole 1326. The handle 1325 is pressed to enable the two cam blocks 1328 to press against the compressing block 1324, so that the two clamping portions 1322 move toward each other, and the accommodating hole 1327 is narrowed to clamp the fixed shaft 222, so that the calibration rod 21 may be conveniently fixed to the fixture 132.

When the calibration member 20 is dismantled from the fixture 132, the handle 1325 is pulled up, the two cam blocks 1328 release squeezing of the compressing block 1324, and the two clamping portions 1322 move away from each other. The fixed shaft 222 is loosened to take the calibration member 20 down from the fixture 132.

When the calibration member 20 is mounted on the fixture 132 with cooperation of the locating pin 224 and the locating hole 1326, it is ensured that the calibration rod 21 is perpendicular to the vertical rod 12, so as to ensure the calibration rod 21 is horizontally disposed after the base body 110 is horizontally adjusted, thereby providing an accurate horizontal reference line for the vehicle-mounted night-vision video recording apparatus.

Figure 13:
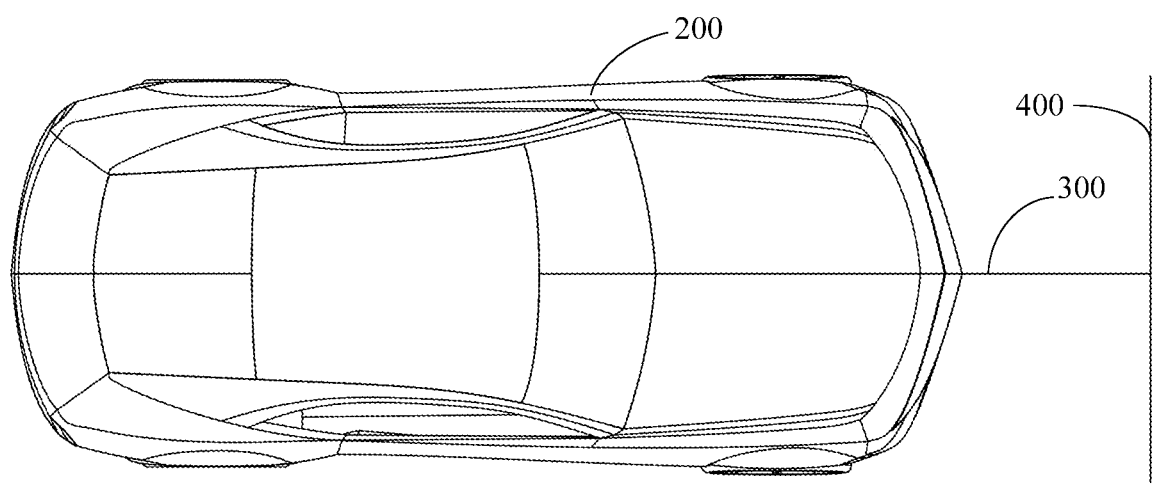
FIG. 13 to FIG. 15 are respectively schematic diagrams of different steps in which an vehicle-mounted night-vision video recording apparatus is calibrated using a calibration device according to an embodiment of the present invention.

Referring to FIG. 13, in a first step of calibrating the vehicle-mounted night-vision video recording apparatus, a central line of a body of a to-be-measured automobile 200 is calibrated, and a central projection line 300 thereof is marked on the ground. According to a vehicle calibration requirement, an equidistant line 400 of a calibrating distance that is perpendicular to the central projection line 300 is drawn.

Figure 14:
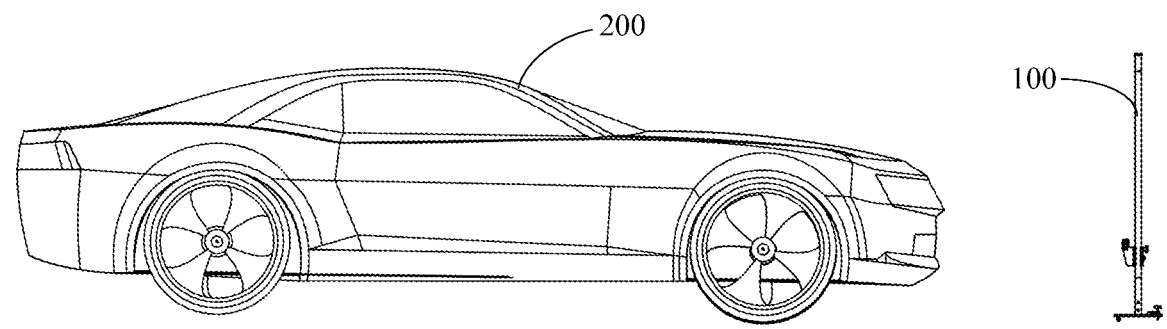
Figure 15:
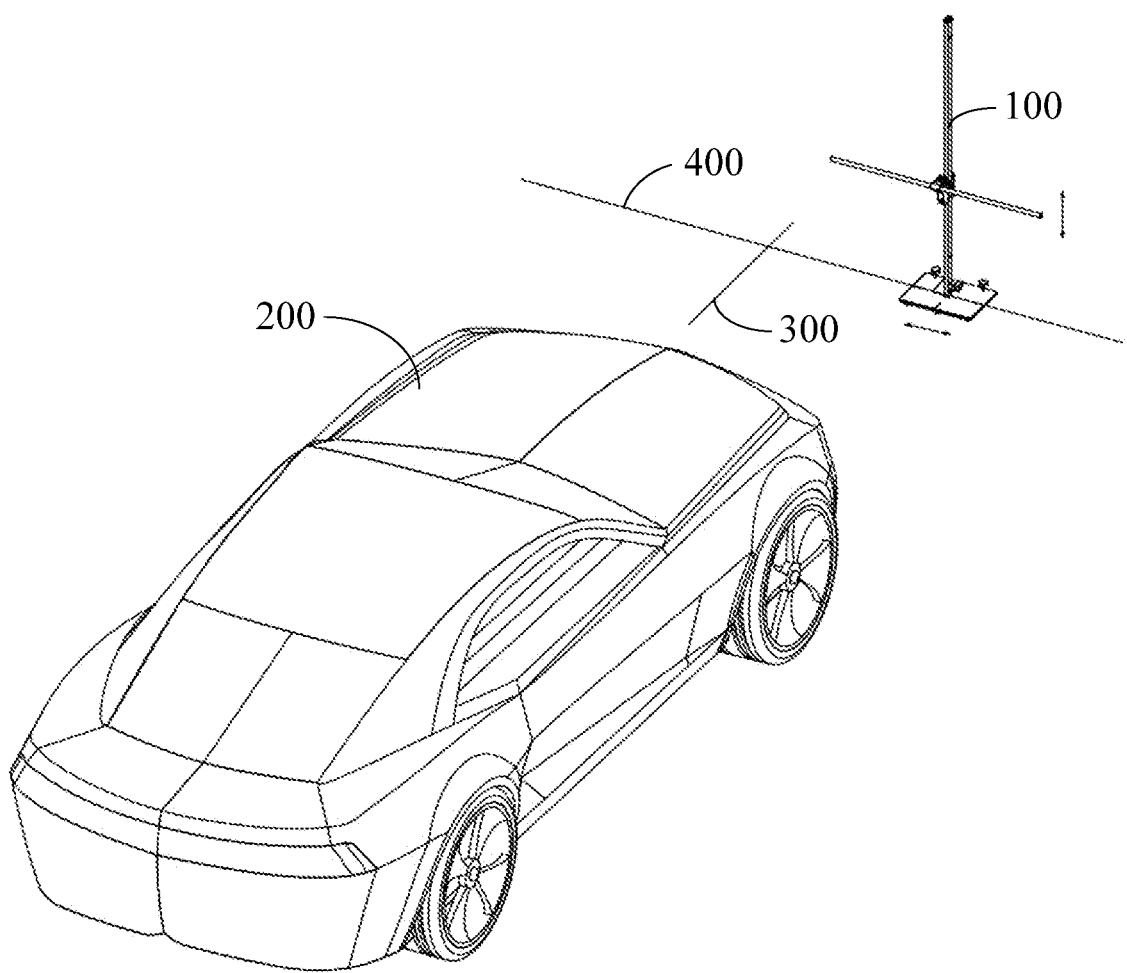

Referring to FIG. 4, FIG. 14, and FIG. 15 together, in a second step of calibrating the vehicle-mounted night-vision video recording apparatus, the calibration device 100 directly faces a head of the to-be-measured automobile 200, and a first calibrating line 1105 and a second calibrating line 1106 of the base body 110 and the equidistant line 400 overlap. Left and right positions of the base body 110 are adjusted according to a position of the vehicle-mounted night-vision video recording apparatus of the to-be-measured automobile 200, so that the third calibrating line 1107 and the central projection line 300 overlap. A height of the calibration rod 21 is adjusted until the calibration rod 21 and a horizontal line of the screen basically overlap on a night-vision display screen interface, that is, initial alignment of the calibration device 100 and the night-vision video recording apparatus is completed.

In a third step of calibrating the vehicle-mounted night-vision video recording apparatus, the first calibrating line 1105 and the second calibrating line 1106 are kept to overlap the equidistant line 400, and the third calibrating line 1107 is kept to overlap the central projection line 300. A horizontal adjustment member 113 on the base body 110 is adjusted to enable bubbles of the first horizontal bead 1140 and the second horizontal bead 1142 to be at central positions. The height of the calibration rod 21 is adjusted, until a center of the calibration rod 21 overlaps a center of a central line of the vehicle-mounted display screen when the bubbles of the first horizontal bead 1140 and the second horizontal bead 1142 are at the center. When the calibration device 100 is kept unmovable, depression and elevation angles of the vehicle-mounted night-vision video recording apparatus is adjusted to enable the horizontal line of the vehicle-mounted display screen and the calibration rod 21 to completely overlap, and therefore calibration of the vehicle-mounted night-vision video recording apparatus is completed.

In the embodiment of the present invention, a height of the calibration member 20 is adjustable, and the calibration member 20 includes the horizontally disposed calibration rod 21. Through observation of the vehicle-mounted night-vision display screen interface and adjustment of depression and elevation angles of the vehicle-mounted night-vision video recording apparatus, the horizontal line of the vehicle-mounted screen and the calibration rod 21 overlap, so that calibration of the vehicle-mounted night-vision video recording apparatus is completed. The device 100 for calibrating the vehicle-mounted night-vision video recording apparatus may calibrate different types of vehicle-mounted night-vision video recording apparatuses with simple calibration operations.

In addition, after the fixed shaft 222 is inserted into the accommodating hole 1327, and the clamping portion 1322 clamps a structure of the fixed shaft 222, the calibration member 20 may be conveniently and rapidly mounted on the fixture 132 or dismantled from the fixture 132. What's more, when the locating pin 224 is inserted into the locating hole 1326, it may be ensured that the calibration rod 21 is perpendicular to the vertical rod 12, so that the calibration rod 21 is horizontally disposed after the base body 110 is horizontally adjusted, thereby providing an accurate horizontal reference line for the vehicle-mounted night-vision video recording apparatus.

Furthermore, with the self-locking member 134, the height of the sliding assembly 13 may be adjusted by a large stroke, or the height of the sliding assembly 13 may be fine adjusted, which may be flexibly adapted to different use requirements.

Finally, the third calibrating line 1107 is disposed on the base body 110 to facilitate calibration of a holder apparatus 100 with a central line of the automobile body on a central projection line 300 on the ground. At least one of the first calibrating line 1105 and the second calibrating line 1106 is disposed on the base body 110 to facilitate calibration of the holder apparatus 100 with the equidistant line 400, thereby making preparation for accurate calibration of the calibration member 20 carried by a holder assembly 10. In addition, a central axis of the locating hole 1326 and a central axis of the accommodating hole 1327 are both parallel to the third calibrating line 1107, and the central axis of the locating hole 1326, the central axis of the accommodating hole 1327, and the third calibrating line 1107 are located in a same vertical plane. When the third calibrating line 1107 is calibrated with the central projection line 300, the center of the calibration member 20 may be conveniently aligned with the central line of the to-be-calibrated automobile 200.

It should be finally noted that the above embodiments are merely intended for describing the technical solutions of the present invention rather than limiting the present invention. Based on the idea of the present invention, the technical features in the foregoing embodiments or different embodiments may be combined, the steps may be implemented in any order, and many other changes in the different aspects of the present invention as described above may exist. For brevity, such changes are not provided in the detailed descriptions. Although the present invention is described in detail with reference to the foregoing embodiments, those of ordinary skill in the art should understand that they can still make modifications to the technical solutions described in the foregoing embodiments or make equivalent substitutions to some technical features thereof, without departing from scope of the technical solutions of the embodiments of the present invention.

What is claimed is:

1. A device for calibrating a vehicle-mounted night-vision video recording apparatus, comprising:
a holder assembly; and
a calibration member mounted on the holder assembly, the calibration member moving relative to the holder assembly to adjust a height of the calibration member, the calibration member comprising a calibration rod, and the calibration rod being disposed horizontally for calibrating the vehicle-mounted night-vision video recording apparatus;
wherein the holder assembly comprises a base, a vertical rod, and a sliding assembly;
the vertical rod being disposed vertically, one end thereof being fixed on the base;
the sliding assembly being movably mounted on the vertical rod and sliding along the vertical rod; and the calibration member being mounted on the sliding assembly;

wherein the calibration member comprises a fixed portion, the fixed portion being mounted on the calibration rod, the fixed portion comprising a fixed shaft, the fixed shaft being perpendicular to the calibration rod; and an accommodating hole is disposed on the sliding assembly, and the fixed shaft is accommodated in the accommodating hole.

2. The calibration device according to claim 1, wherein the fixed portion comprises a locating pin, the fixed shaft being parallel to the locating pin; and a locating hole is disposed on the sliding assembly, and the locating pin is accommodated in the locating hole.

3. The calibration device according to claim 2, wherein the fixed portion comprises a fixed portion body, the fixed portion body being sleeved on the calibration rod, one end of the fixed shaft being fixedly connected to the fixed portion body, and one end of the locating pin (224) being also fixedly connected to the fixed portion body.

4. The calibration device according to claim 1, wherein the fixed portion is fixedly mounted at a middle portion of the calibration rod.

5. The calibration device according to claim 1, wherein the calibration rod is a carbon fiber tube having a length of one meter.

6. The calibration device according to claim 1, wherein the sliding assembly comprises a fixture, the fixture comprising a fixture body, a clamping portion, a connecting rod, and a handle;

two clamping portions extend from the fixture body, an accommodating hole is disposed between the two clamping portions, and there is a gap between the two clamping portions, the gap being in communication with the accommodating hole;

one end of the connecting rod penetrate through one of the clamping portions and is fixed to the other clamping portion, and the other end of the connecting rod is hinged on the handle; and a cam block and a rotation shaft are disposed on the handle, one end that is of the connecting rod and that is away from the clamping portion being connected to the rotation shaft, two cam blocks being sleeved at both ends of the rotation shaft, and the two cam blocks rotating relative to the rotation shaft, to press against the clamping portion, so that the two clamping portions clamp the fixed shaft.

7. The calibration device according to claim 6, wherein the fixture comprises a compressing block, the compressing block being sleeved on the connecting rod, and the compressing block being located between the clamping portion and the cam block.

8. The calibration device according to claim 1, wherein the sliding assembly comprises a clamping member, the clamping member being sleeved on the vertical rod and sliding along the vertical rod, and the clamping member clamping the vertical rod to fix the sliding assembly to a required position.

9. The calibration device according to claim 8, wherein a rack is further disposed on the vertical rod, the rack being disposed in a vertical direction;

the sliding assembly comprises a self-locking member, the self-locking member comprising a fine adjustment knob and an adjusting gear;

the fine adjustment knob being movably adjusted on the clamping member, and the fine adjustment knob rotating relative to the clamping member; and the adjusting gear being sleeved on the fine adjustment knob, and the adjusting gear being meshed with the rack to fine adjust a height of the sliding assembly.

10. The calibration device according to claim 9, wherein the self-locking member comprises a fixed rotation shaft, a pressing plate, and an elastic member;

both ends of the fixed rotation shaft being respectively fixed on the clamping member, and a central axis of the fixed rotation haft being parallel to a rotation axis of the fine adjustment knob;

the pressing plate being sleeved on the fixed rotation shaft and the fine adjustment knob, and the pressing plate rotating around the fixed rotation shaft for driving the fine adjustment knob to move relative to the clamping member, so that the gear is separated from the rack; and the elastic member being compressed between the pressing plate and the clamping member to provide recovery elasticity for the pressing plate, so that the adjusting gear (1341) compresses the rack.

11. The calibration device according to claim 10, wherein the pressing plate comprises a pressing plate body and a mounting ear;

two mounting ears extending from the pressing plate body, and the pressing plate body being sleeved on the fixed rotation shaft; and the two mounting ears being sleeved on the fine adjustment knob, and the adjusting gear being located between the two mounting ears.

12. The calibration device according to claim 8, wherein the clamping member comprises a first clamping plate, a second clamping plate, and a locking knob;

the first clamping plate and the second clamping plate being respectively located at two opposite sides of the vertical rod and respectively abutting against the vertical rod; and one end of the locking knob penetrating through the first clamping plate, the locking knob being engaged with the first clamping plate through threads, and when the locking knob is rotated, the locking knob penetrating through one end of the first clamping plate to abut against the vertical rod, so that the clamping member is fixed to the vertical rod.

13. The calibration device according to claim 12, wherein the clamping member comprises a friction pad and a pad screw;

the friction pad being disposed between the first clamping plate and the vertical rod for increasing friction between the first clamping plate and the vertical rod; and one end of the pad screw penetrating through the first clamping plate and abutting against the friction pad, and when the pad screw is rotated, a degree of contact between the friction pad and the vertical rod being adjusted, to adjust a magnitude of friction between the friction pad and the vertical rod.

14. The calibration device according to claim 1, wherein the base comprises a base body, a horizontal adjustment member, and a gradienter;

one end of the vertical rod being fixed to the base body;

the horizontal adjustment member being mounted on the base body for adjusting a horizontal angle of the base body; and the gradienter being mounted on the base body for detecting whether the base body is horizontally disposed.

15. The calibration device according to claim 14, wherein the base comprises a supporting member, one end of the supporting member being fixed on a lower surface of the base body, and there being at least one supporting member, wherein one intersection point formed through intersection of one supporting member and the lower surface, and two intersection points formed respectively through intersection of the two horizontal adjustment members and the lower surface are respectively located at three vertexes of an isosceles triangle.

16. The calibration device according to claim 15, wherein there are three supporting members, the three supporting members being arranged in order along a first straight line; and two of the horizontal adjustment members are arranged in order along a second straight line, the first straight line being parallel to the second straight line.

17. The calibration device according to claim 14, wherein the horizontal adjustment member comprises a handle and a screw portion;

the handle being fixed to one end of the screw portion, and the handle being located over the base body to facilitate rotation of the horizontal adjustment member; and the screw portion penetrating through the base body, the screw portion being engaged with the base body through threads, and the screw portion being vertically disposed.

18. The calibration device according to claim 14, wherein there are at least three horizontal adjustment members, the three horizontal adjustment members respectively intersecting a lower surface of the base body to form three intersection points, and the three intersection points being respectively located at three vertexes of an isosceles triangle.

* * * * *